United States Patent
Taira et al.

(10) Patent No.: US 7,079,098 B2
(45) Date of Patent: *Jul. 18, 2006

(54) IMAGE DISPLAY SYSTEM AND IMAGE DISPLAY METHODS

(75) Inventors: Kazuki Taira, Kawasaki (JP); Tatsuo Saishu, Yokohama (JP); Kouhei Suzuki, Yokohama (JP); Hirotaka Murata, Fukaya (JP); Takashi Nishimura, Fukaya (JP); Masaaki Tamatani, Fujisawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/186,993

(22) Filed: Jul. 2, 2002

(65) Prior Publication Data

US 2002/0180678 A1 Dec. 5, 2002

Related U.S. Application Data

(63) Continuation of application No. 09/285,269, filed on Apr. 2, 1999, now Pat. No. 6,825,823.

(30) Foreign Application Priority Data

Apr. 3, 1998 (JP) ................................. 10-091072

(51) Int. Cl.
*G09G 3/36* (2006.01)
*G02F 1/1335* (2006.01)

(52) U.S. Cl. ............................. 345/88; 345/87; 349/65
(58) Field of Classification Search .................... 345/7, 345/88, 87, 90, 102; 349/65; 257/89; 359/53; 340/795
See application file for complete search history.

(56) References Cited

U.S. PATENT DOCUMENTS

| 4,978,952 | A | * | 12/1990 | Irwin ......................... 345/102 |
| 5,347,378 | A | * | 9/1994 | Handschy et al. ............ 359/53 |
| 5,459,337 | A | * | 10/1995 | Ito et al. ....................... 257/89 |
| 6,097,352 | A | * | 8/2000 | Zavracky et al. ............... 345/7 |

OTHER PUBLICATIONS

"Display Trends", Summer 2001, pp. 1-5.
Technical Standardization Committee on Electronic Display Devices, "Technical Report of Japan Electronics and Information Technology Industries Association", Technical Guide of Electronic Display Devices, Nov. 2000, pp. 1-2.

* cited by examiner

*Primary Examiner*—Sumati Lefkowitz
*Assistant Examiner*—Srilakshmi K Kumar
(74) *Attorney, Agent, or Firm*—Oblon, Spivak, McClelland, Maier & Neustadt, P.C.

(57) ABSTRACT

An image display system produces a color image by arranging a color shutter capable of time-divisionally switching a plurality of colors to be displayed, in front of a monochrome image display. This image display system comprises: a self-luminous image display part for time-divisionally displaying monochrome images corresponding to three primary colors; and a color display part for time-divisionally coloring and outputting the monochrome images which formed on the side of the light outgoing surface of the self-luminous image display part and which correspond to the three primary colors. The color display part further comprises: a liquid crystal cell driven by carrying out an optical switching on the basis of the inversion between positive and negative polarities; a transparent electrode formed by dividing the liquid crystal cell into a plurality of parts; and a liquid crystal color shutter capable of optionally setting display colors for a plurality of display regions by means of the transparent electrode, the liquid crystal color shutter displaying different display colors for at least two display regions in an optional time in a driving condition.

10 Claims, 12 Drawing Sheets

| POLARIZING PLATE | COLOR | ABSORPTION AXIS DIRECTION |
|---|---|---|
| 104 | NEUTRAL | A' (90°) |
| 105 | RED | A' (90°) |
| 106 | CYAN | A (0°) |
| 107 | YELLOW | A (0°) |
| 108 | VIOLET | A' (90°) |

IMAGE DISPLAY SYSTEM AND IMAGE DISPLAY METHODS

BACKGROUND OF THE INVENTION

The present invention relates generally to an image display system for producing a color image by arranging a color shutter capable of time-divisionally switching a plurality of colors to be displayed, in front of a monochrome image display, and an image display method using the image display system.

As a method for displaying a color image, it is usually well carried out to synthesize images of red (R), green (G) and blue (B), which are three primary colors of light, or to divide the images. Such an image synthesizing method for displaying images is divided into a space sharing display for two-dimensionally arranging dots for R, G and B to spatially arrange an image, and a time sharing display for displaying R, G and B images in time series. Typically, color cathode ray tubes and liquid crystal displays use the space sharing display since R, B and G pixels are two-dimensionally arranged. Similarly, in the case of an image pickup, there are adopted methods for spatially arranging R, G and B color filters and for providing a color filter, which is capable of changing display colors in time series, in front of an image pickup element. A process for displaying an image will be briefly described below.

The time sharing display is achieved by quickly switching display colors on the whole display surface in synchronism with the display for R, G and B images by means of R, G and B color filters or the like. It is necessary for the time sharing display to switch the display for images at a higher speed than three times as high as that in the spatial sharing display. However, it is not necessary for the time sharing display to divide a pixel into parts for R, G and B images, so that it is possible to achieve a higher definition image. As a method for switching the display color, there is known a method for mechanically rotating a disc-like color filter which is divided into equal three parts and which is color-coded. As a method for electrically switching the display color, Bos, et al. proposes a technique in Japanese Patent Publication No. 4-49928, which discloses a so-called liquid crystal color shutter, which comprises two liquid crystal cells and color polarizing plates arranged on both sides thereof, for switching ON/OFF of the liquid crystal cells to control the plane of polarization for light to select the wavelength of light absorbed into the polarizing plates to display R, G and B. This liquid crystal color shutter has advantages in that there are no mechanical operations, the area of the color shutter can be equal to the area of the display screen to reduce required space, and so forth.

In the liquid crystal color shutter, the absorption axes of a plurality of color poling plates are perpendicular to each other. The two liquid crystal cells are turned ON and OFF to directly transmit the polarized light of an incident light or to rotate the polarized light by 90 degrees to transmit or absorb specific wavelength components, so that a desired display color can be obtained. One of conventionally proposed liquid crystal color shutters is a PI cell having a bend alignment. This can achieve a higher response speed than that of a TN (twisted nematic) cell, which is generally used as a liquid crystal display, i.e., a response time of about 2 ms.

On the other hand, in the case of the time sharing display, there is caused a so-called "color breakup" interference wherein the profile of a display image appears to be iridescent due to observer's blink, the movement of observer's eye, the movement of an object on a dynamic image, and so forth. In order to reduce the color breakup interference, it is desired to increase the switching speed for R, G and B to switch R, G and B as much as possible in a predetermined period of time such as one field period. For example, in the case of a triple speed display for displaying each of subfields R, G and B once in one field period, the display period for each color is 1/(60 Hz×3)=5.6 ms assuming that one field is 60 Hz. Here, one field period is defined as a period necessary for completing one color picture in spite of interlace or non-interlace display. For example, one field corresponds to 60 Hz in the case of an NTSC (National Television System Committee) color system for performing the interlace display.

However, if the frequency of subfields R, G and B displays in one field period is intended to increase in order to more reduce the color breakup interference, the response speed of the PI cell is not sufficient as shown in FIG. 1, so that it is required to provide a switching element having a higher response time. For example, when each of subfields R, G, B is displayed twice in a field of 60 Hz, the subfield period for each color is 1/(60×6)=2.8 ms. When 2 ms serving as a response time of the PI cell is subtracted from the display period for each color, it is possible to ensure only 800 μs, which is 28% of the whole display period for each color, as an appropriate display time.

As described above, in the case of the conventional time sharing type display system using the liquid crystal color shutter, there are problems in that the cell itself of the liquid crystal color shutter does not have a sufficient response time, so that a color breakup interference is caused.

SUMMARY OF THE INVENTION

It is therefore an object of the present invention to eliminate the aforementioned problems and to provide an image display system and image display method, which can ensure a sufficient response time of cells of a liquid crystal color shutter in a time sharing display system for reducing a color breakup interference.

In order to accomplish the aforementioned and other objects, according to a first aspect of the present invention, there is provided an image display system for producing a color image by arranging a color shutter capable of time-divisionally switching a plurality of colors to be displayed, in front of a monochrome image display, the image display system comprising: self-luminous image display means for time-divisionally displaying monochrome images corresponding to three primary colors; and color display means for time-divisionally coloring and outputting the monochrome images which formed on the side of a light outgoing surface of the self-luminous image display means and which correspond to the three primary colors, the color display means comprising a liquid crystal cell driven by carrying out an optical switching on the basis of the inversion between positive and negative polarities of the applied voltage, a transparent electrode formed by dividing the liquid crystal cell into a plurality of parts, and a liquid crystal color shutter capable of optionally setting display colors for a plurality of display regions by means of the transparent electrode, the liquid crystal color shutter displaying different display colors for at least two display regions in an optional time in a driving condition.

According to a second aspect of the present invention, in the image display system according to the first aspect, the self-luminous image display means is monochrome luminescent display means for displaying a monochrome image by a line scanning, the monochrome luminescent display means comprising at least one of a monochrome CRT (Cathode Ray Tube), a monochrome EL (Electro-Luminescent) display element, an FED (Field Emission Display) and a PDP (plasma display element), which have a frequency F necessary to display all of screens corresponding to the three primary colors, and the monochrome luminescent display element having a phosphor having an $\frac{1}{10}$ afterglow time which is a reducing time $\tau$, in which a peak density of luminescent becomes $\frac{1}{10}$, meeting the following relationship:

$$\tau \leq \{(1/4 - 1/3n)/NF - T\}/2$$

assuming that the liquid crystal color shutter has n divided display regions, a frequency for repeatedly displaying three primary colors for a field period 1/F derived from the frequency F being N, and a response time of the liquid crystal color shutter being T.

According to a third aspect of the present invention, in the image display system according to the first aspect, the liquid crystal color shutter displays four colors including red, green and blue in each field period, and the total of display periods for each color in each field period is equal to each other.

According to a fourth aspect of the present invention, in the image display system according to the third aspect, a fourth display color other than the red, green and blue are displayed in switching periods between the red, green and blue.

According to a fifth aspect of the present invention, there is provided an image display method for producing a color image using an image display system wherein a color shutter capable of time-divisionally switching a plurality of colors to be displayed is arranged in front of a monochrome image display, the image display method comprising a step of time-divisionally displaying monochrome images corresponding to three primary colors using self-luminous image display means; and a step of time-divisionally coloring and outputting the monochrome images, which are formed on the side of a light outgoing surface of the self-luminous image display means and which correspond to the three primary colors, using color display means; wherein the time-divisionally displaying step further includes a sub-step of optionally setting display colors for a plurality of display regions by means of a transparent electrode which is driven by carrying out an optical switching on the basis of the inversion between positive and negative polarities and which is formed by dividing a liquid crystal cell forming the color display means into a plurality of parts; and a sub-step of displaying different display colors for at least two display regions in an optional time in a driving condition, using a liquid crystal color shutter formed by the transparent electrode.

According to a sixth aspect of the present invention, in the image display method according to the fifth aspect, the self-luminous image display means is monochrome luminescent display means for displaying a monochrome image by a line scanning, the monochrome luminescent display means comprising at least one of a monochrome CRT, a monochrome EL luminescent display element, an FED and a plasma display element, which have a frequency F necessary to display all of screens corresponding to the three primary colors, and the monochrome luminescent display element having a phosphor having an $\frac{1}{10}$ afterglow time $\tau$ meeting the following relationship:

$$\tau \leq \{(1/4 - 1/3n)/NF - T\}/2$$

assuming that the liquid crystal color shutter has n divided display regions, a period for repeatedly displaying three primary colors for a field period 1/F derived from the frequency F being N, and a response speed of the liquid crystal color shutter being T.

According to a seventh aspect of the present invention, in the image display method according to the fifth aspect, the liquid crystal color shutter displays four colors including red, green and blue in each field period, and the total of display periods for each color in each field period is equal to each other.

According to an eighth aspect of the present invention, in the image display method according to the seventh aspect, a fourth display color other than the red, green and blue are displayed in switching periods between the red, green and blue.

Furthermore, the liquid crystal cell according to the first or fifth aspect may be a liquid crystal cell of spontaneous polarization, such as an FLC (ferroelectric liquid crystal) or an AFLC (antiferroelectric liquid crystal) cell, or a liquid crystal cell having a chiral smectic liquid crystal or a DHF (deformed helix ferroelectric liquid crystal).

Moreover, the processing speed may increase as the variation of the frequency N for repeating the display for the three primary colors according to the second or sixth aspect. It is possible to achieve triple speed when N=1, sixfold speed when N=2, and ninefold speed when N=3 in comparison with a field frequency in a time sharing display.

DESCRIPTION OF THE PREFERRED EMBODIMENTS

Figure 1:
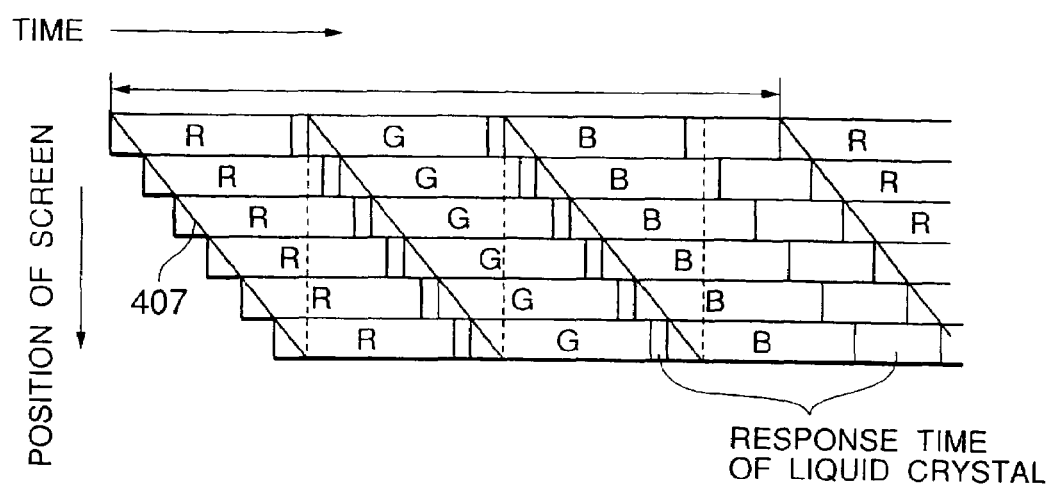
FIG. 1 is a diagram showing a driving method for displaying an image by means of a conventional liquid crystal color shutter.

Referring now to the accompanying drawings, the preferred embodiments of an image display system and an image display method according to the present invention will be described below. Before describing the preferred embodiments referring to the accompanying drawings, the basic concept of the present invention will be described.

In an image display system and an image display method according to the present invention, means for time-divisionally displaying monochrome images may include all monochrome luminescent display elements for displaying monochrome images using the line scanning, such as white light emission monochrome CRTs, monochrome EL emission display elements, FEDs and plasma display elements.

According to the present invention, color display means comprises at least two liquid crystal cells having a liquid crystal of spontaneous polarization, such as ferroelectric and antiferroelectric liquid crystals, and a liquid crystal color shutter of chromatic color polarizing plates capable of absorbing only a light component of a specific visible wavelength region on the absorption axis thereof, or a liquid crystal color shutter using a so-called guest-host (GH) liquid crystal cell wherein a dichroic pigment is mixed in a liquid crystal layer of spontaneous polarization, such as ferroelectric and antiferroelectric liquid crystals.

The principle of the liquid crystal color shutter using the chromatic color polarizing plates is described in detail, e.g., in Japanese Patent Publication No. 4-49928 which discloses that the retardation of a liquid crystal cell can provide two states per one cell and four states per two cells by switching the voltage applied state and that the three primary colors, R, G and B, can be displayed using three states out of the four states.

The three primary display method is achieved by the fact that when a light is transmitted through a liquid crystal, the polarized state thereof is changed by the retardation of the liquid crystal to selectively switch visible light components absorbed into a chromatic color polarizing plate provided in an optical path. A plurality of chromatic color polarizing plates are combined with each other so as to have a polarization axis perpendicular to those of other chromatic color polarizing plates. The retardation of the ferroelectric or antiferroelectric liquid crystal cell is set so that the polarization axis of one of the polarizing plates is parallel to that of the other polarizing plate on a certain voltage applied condition and at an angle of 45 degrees to that of the other polarizing plate on the other voltage applied condition.

The central wavelength of the retardation is preferably set in the range of from 450 nm to 580 nm. With such an optical configuration, the incident polarized light is transmitted through the incident side polarizing plate without modulation on the former condition and while the plane of polarization thereof is rotated by 90 degrees on the latter condition.

In the case of the GH liquid crystal color shutter, the GH liquid crystal cell may have a three-layer structure of dichroic pigments of cyanogen, magenta and yellow, or a three-layer structure of dichroic pigments of red, green and blue, to achieve the operation of a liquid crystal color shutter. These liquid crystal layers may have a macromolecule structure. In the GH liquid crystal color shutter, an alignment of the liquid crystal is selected by a polarity of applied voltage to perform switching. For example, in the case of displaying the red, the GH liquid crystal color shutter of R, G and B makes a Red layer be colored and Green and Blue layers be transparent or translucent Furthermore, in the case of the GH liquid crystal color shutter of cyan, magenta and yellow, the color shutter makes the cyan layer be transparent and magenta and yellow layers be colored.

It is desired to apply a positive polarity on one of the voltage applied conditions and a negative polarity on the other voltage applied condition. For example, R color is displayed by applying +V(V) to a first liquid crystal cell and +V to a second liquid crystal cell, and G color is displayed by applying +V to the first liquid crystal cell and −V to the second liquid crystal cell. Similarly, B color is displayed by applying −V to the first liquid crystal cell and +V to the second liquid crystal cell. All of the display periods for these R, G and B display colors are preferably equal to each other.

The condition where −V is applied to both of the first and second liquid crystal cells remains. On this condition, any colors may be displayed. However, in order to cause an average applied voltage to be zero in one field period, which includes at least one cycle for displaying R, G and B, to prevent a dc voltage causing sticking from being applied to each liquid crystal cell, the remaining display state (which will be hereinafter referred to as a K display state) preferably has a period equal to each of the R, G and B display periods, i.e., one field period. For example, assuming that the R, G and B display periods are represented by [R], [G], [B] periods and the K display period divided into equal three parts is represented by [K/3], the display sequence for displaying each of R, G, B once in one field is, e.g., [R], [K/3], [G], [K/3], [B], [K/3]. The display sequence of [R], [G], [B] may be optionally changed.

The above described display sequence is switched in synchronism with, e.g., the electron beam scanning of a monochrome CRT. For example, when an R screen is scanned, the liquid crystal color shutter causes R to be displayed. In this case, the electron beam interlace-scans or noninterlace-scans from the left-upper to the right-lower on the screen viewed from the observer. Assuming that the liquid crystal color shutter is not divided and that the whole screen of the liquid crystal color shutter is switched all at once, the screen can not be scanned in the [K/3] period in which an undesired display color is displayed. Therefore, it is required to divide the screen of the liquid crystal color shutter into a plurality of regions in vertical directions of the screen to carry out the scroll display switching in synchronism with the scanning of the electron beam.

The timings of the scanning period for the electron beam and the display period for the liquid crystal color shutter will be considered. For example, the period [R] necessary to display R in a certain display region for the liquid crystal color shutter includes a scanning period wherein an R image is scanned on the corresponding CRT screen region by an electron beam, and an afterglow period wherein a phosphor is emitting light. Therefore, when the screen is updated at a certain field frequency, a display period [R] determined by the number of repeated sets of R, G and B displays in one field period must include an electron beam scanning period in a predetermined display region, and a period in which the afterglow of the phosphor emitting light by the scanning disappears.

Figure 2A:
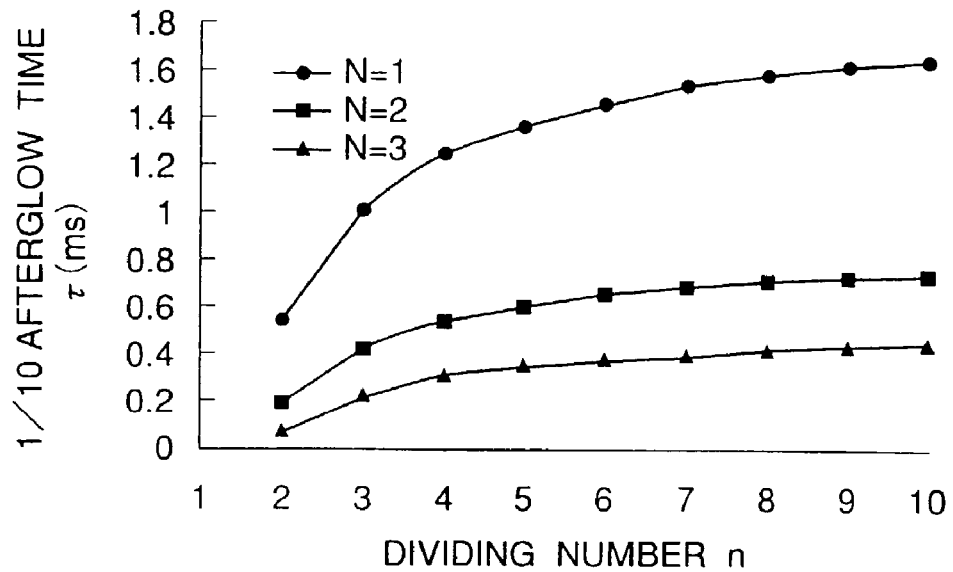
FIG. 2A is a graph showing a desired value of a CRT phosphor afterglow characteristic on various driving conditions of an image display system according to the present invention, on the basis of the relationship between sharing number n and afterglow permissible time.
Figure 2B:
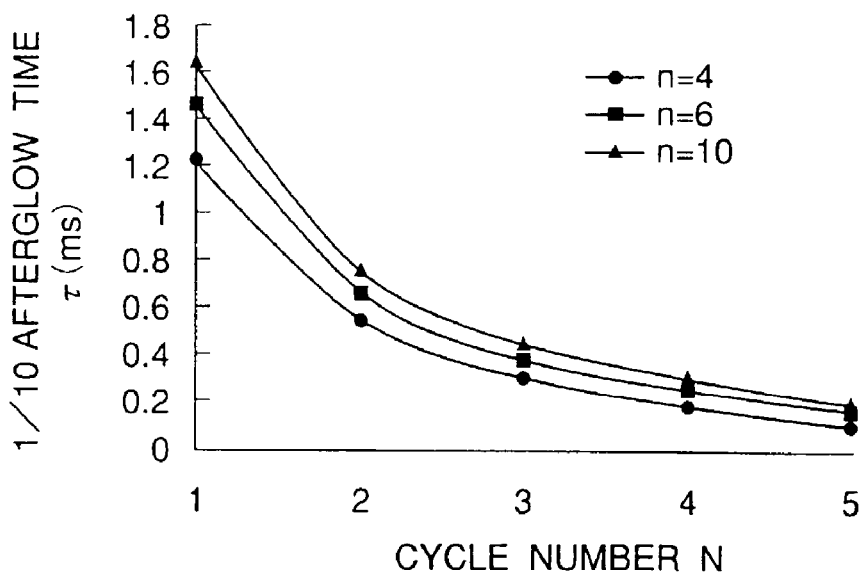
FIG. 2B is a graph showing the desired value of the afterglow characteristic on the basis of the relationship between the number N of cycles and afterglow permissible time.

Assuming that the afterglow time characteristic of the phosphor decreases exponentially, the relationship between the permissible time for 1/10 afterglow time that the emission intensity of the phosphor attenuates to 1/10, and the construction and driving conditions of the liquid crystal color shutter is derived. Assuming that a field frequency is F (Hz), one field period is 1/F (s). Assuming that the number of cycles for switching R, G and B displays in the period of 1/F is N (e.g., when N=2, the R, G and B displays are repeated twice so as to be RGBRGB), the repeat period for one set of R, G and B is 1/NF (s). As described above, in the case of a ferroelectric or antiferroelectric liquid crystal cell, it is required to carry out the K display other than the R, G and B displays within the period of 1/NF, so that the display period for each of R, G and B is 1/4NF (s). On the other hand, if the display region of the liquid crystal color shutter is divided into equal n parts, the period necessary to scan each of R, G and B images in each display region is 1/3nNF assuming that a fly back period is disregarded approximately. Assuming that the 1/10 afterglow time of the phosphor is τ (s), the 1/100 afterglow time that the intensity ratio is −40 dB when the attenuation of the emission intensity appears to be substantially completed, is 2τ. If this is enjoined by the response speed T of the liquid crystal, the driving condition to be derived is $1/4NF \geqq 1/3nNF+2\tau+T$. That is, the permissible time for the 1/10 afterglow time of the phosphor is given by $\tau \leqq \{(1/4-1/3n)/NF-T\}/2$. For example, when F=60 Hz, N=1, n=5 division, and T=0.3 ms, then the condition for the 1/10 afterglow time τ is τ≦1.37 ms. FIG. 2 shows the relationship between the sharing number n of the display screen, the number N of cycles for displaying the R, G and B in one field period, and the 1/10 afterglow permissible time of the phosphor meeting the condition that the afterglow intensity is −40 dB.

Referring to the accompanying drawings, the preferred embodiment of an image display system according to the present invention will be described in detail below. However, the image display system according to the present invention should not be limited to any one of the preferred embodiments which will be described below, and the invention may include various combinations of the constructions of the preferred embodiments.

Figure 3A:
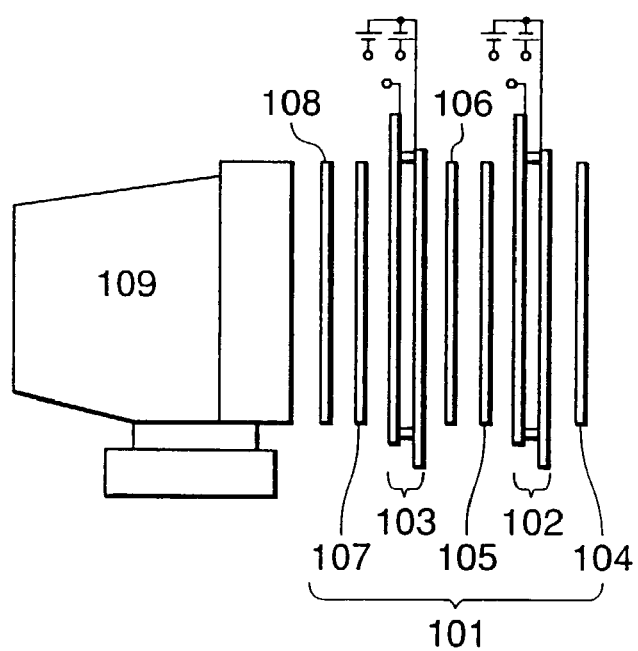
FIG. 3A is a schematic side view of the first preferred embodiment of an image display system according to the present invention.
Figure 3B:
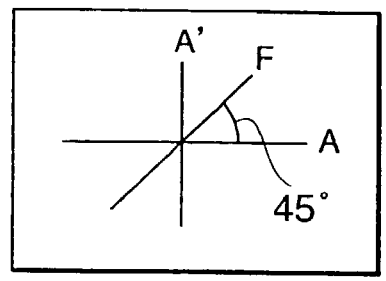
FIG. 3B is a front view thereof.

First, referring to FIGS. 3A and 3B, the first preferred embodiment of an image display system according to the present invention will be described. FIG. 3A is a schematic side view of the first preferred embodiment of an image display system according to the present invention, and FIG. 3B is a front view thereof. In the first preferred embodiment, a liquid crystal color shutter 101 comprises antiferroelectric liquid crystal cells 102 and 103, and polarizing plates 104, 105, 106, 107 and 108. Assuming that the optical axis in longitudinal directions of a screen viewed from the front of the screen (in directions in which the polarizing plate 107 is viewed from the side of the polarizing plate 104) is A and the optical axis in lateral directions of the screen is A', one of phase advancing axes F of the antiferroelectric liquid crystal is at an angle of 45 degrees to A and A'. A monochrome CRT 109 is provided tightly on the back of the liquid color shutter.

Figure 4A:
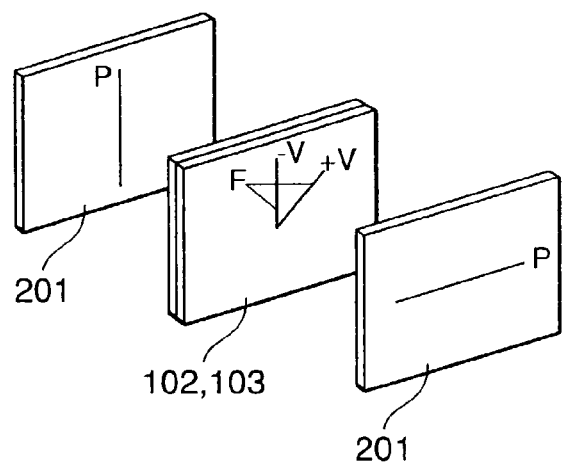
FIG. 4A is a perspective view showing the shutter operation principle of an antiferroelectric liquid crystal cell of a liquid crystal color shutter in the first preferred embodiment of an image display system according to the present invention.
Figure 4B:
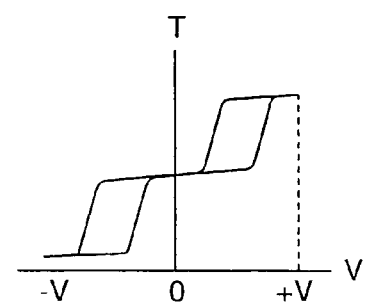
FIG. 4B is a characteristic diagram thereof.

FIGS. 4A and 4B show the shutter operation principle of the antiferroelectric liquid crystal 102 or 103 of the liquid crystal color shutter 101. Assuming that the polarized light transmitting axis of an achromatic color (neutral gray) polarizing plate 201 is P, and if the phase advancing axes F are set to be at angles of 0 degree (90 degrees) and 45 degrees to the polarized light transmitting axis P when voltages V of positive and negative polarities are applied to the antiferroelectric liquid crystal cell 102 or 103, the phase of the incident light is not modulated when a voltage of negative polarity is applied, and the plane of polarization is rotated by 45 degrees when a voltage of positive polarity is applied. Therefore, as shown in the graph, the shutter operations for transmission and absorption of the incident light can be achieved by selecting the polarity of the applied voltage.

Figures 5A, 5B:
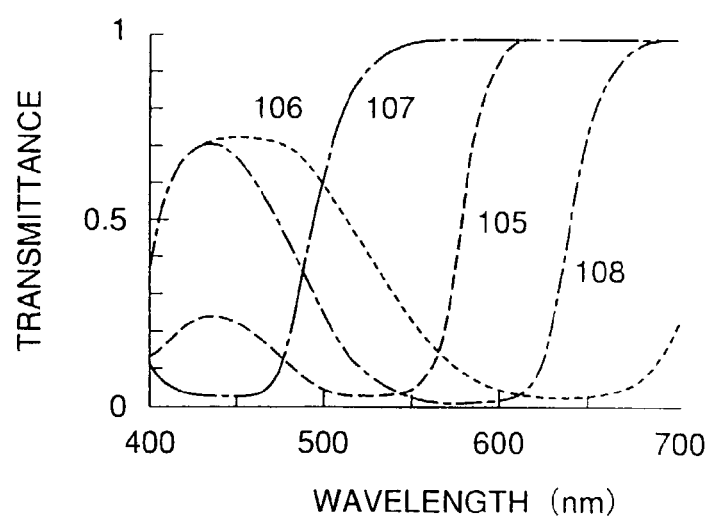
FIG. 5A is a table showing the relationship between display colors and azimuths of a polarization axis (absorption axis) of a polarizing plate of a liquid crystal color shutter in the first preferred embodiment.
FIG. 5B is a characteristic diagram thereof.

FIGS. 5A and 5B shows the relationship between the display colors and azimuths of polarization axes (absorption axes) of the polarizing plates 104 through 108 forming the liquid color shutter in the first preferred embodiment. As shown in FIG. 5A, the display colors of the polarizing plates are determined on the basis of the wavelength region of light absorbed or transmitted in a visible wavelength region. The polarizing plate 104 absorbs light of the whole visible wavelength region since it is an achromatic color polarizing plate. The transmittance of each of other chromatic color polarizing plates 105 through 108 on the absorption axis thereof is shown in FIG. 5B. Although the transmittance characteristic on the side of the transmission axis is not shown in the graph, the transmission characteristics of all of the polarizing plates are substantially uniform over the whole visible region.

Figures 6A, 6B:
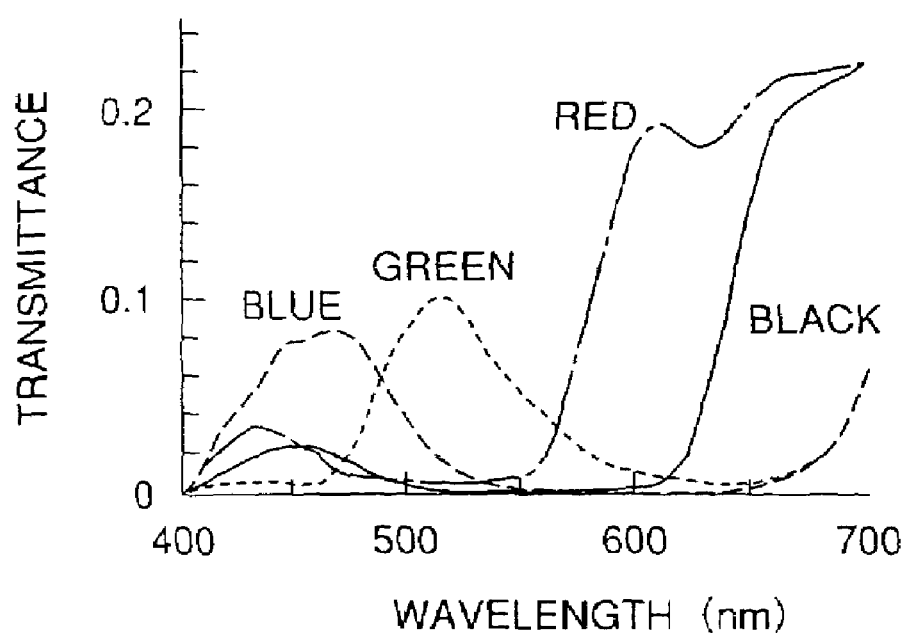
FIG. 6A is a table showing the correspondence relationship between the polarities of voltages applied to a liquid crystal cell and R, G and B displays in the first preferred embodiment.
FIG. 6B is a characteristic diagram showing the transmittance characteristic of a liquid crystal color shutter when R, G, B are displayed.

FIGS. 6A and 6B show the transmittance characteristics when R, G and B are displayed, as the correspondence relationship between the polarities of voltages applied to the liquid crystal cells 102 and 103 and the R, G and B displayed by the liquid crystal shutter 101, on the conditions of the constructions and azimuths of the polarizing plates in FIGS. 5A and 5B. When a voltage of positive polarity is applied to the liquid crystal cell 102 and a voltage of negative polarity is applied to the liquid crystal cell 103, a black display (which will be referred to as "black" for convenience although it is practically dark brown in this preferred embodiment) is obtained as a fourth display color other than R, G and B.

Figure 7A:
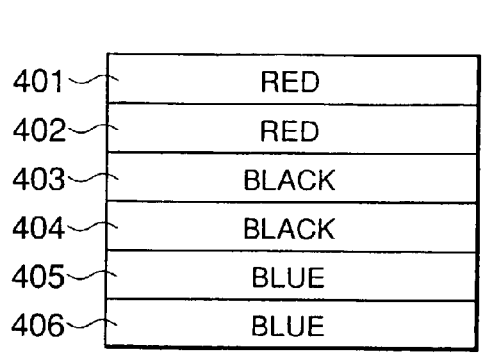
FIGS. 7A and 7B are front views showing display screens of the first preferred embodiment of an image display system according to the present invention.
Figure 7B:
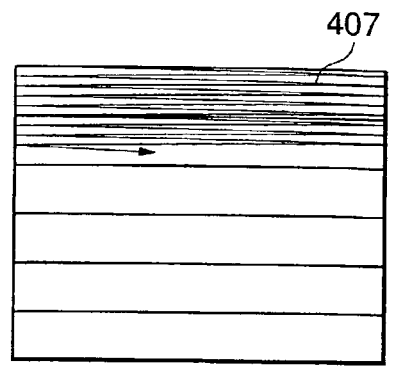

FIGS. 7A and 7B are front views of display screens in the first preferred embodiment of an image display system according to the present invention. FIG. 7A shows display regions capable of separately displaying R, G and B in the liquid crystal color shutter 101. The display regions comprise substantially equal six regions in the first preferred embodiment. Each of the display regions 401 through 406 can optionally display any one of R, G and B by dividing one of transparent electrodes of the liquid crystal cells 102 and 103 into stripes corresponding to the display regions and by independently applying voltage thereto. On the other hand, as shown in FIG. 7B, the CRT 109 is sequentially scanned from the left-upper to the right-lower of the screen similar to the usual CRT screen scanning, to display a monochrome image for each of R, G and B.

Figure 8:
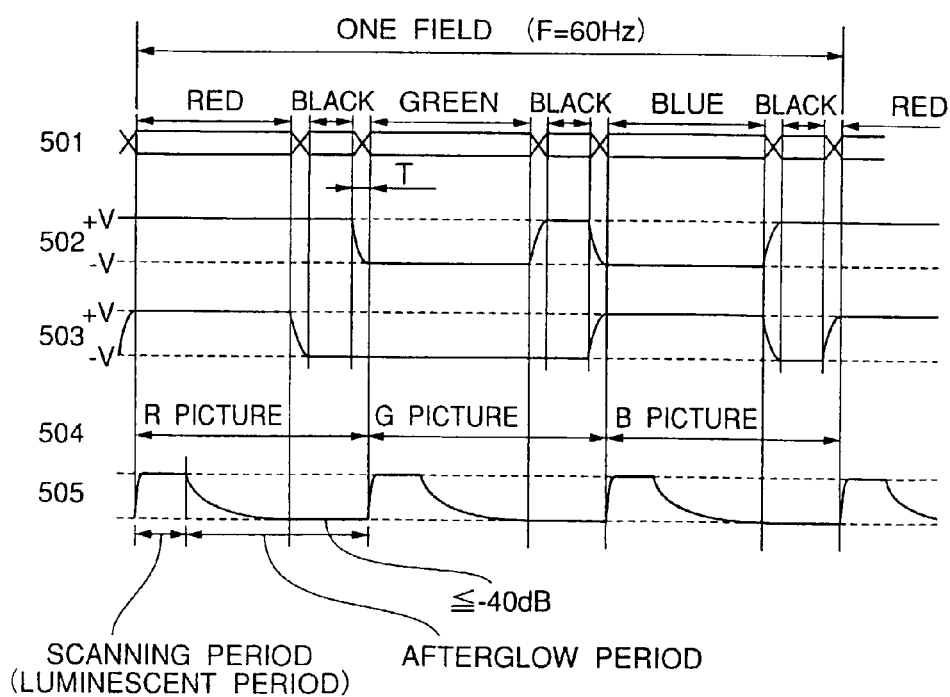
FIG. 8 is a time chart showing operation timings in a driving method for the first preferred embodiment of an image display system according to the present invention.

FIG. 8 is a timing chart showing the driving timing in a driving method for the first preferred embodiment of an image display system according to the present invention. In this image display system, since each of R, G and B images is displayed once in one field period (60 Hz) as shown by 501, the number N of cycles for switching the display for R, G and B is 1. If a part of the display regions in FIG. 7A, e.g., the display region 401, is noticed, the driving timing of the liquid crystal color shutter 101 is shown by 501 through 503, and the driving timing of the CRT 109 is shown by 504 and 505.

That is, the liquid crystal color shutter displays R, G and B as shown by 501, in synchronism with R, G and B images produced by the CRT as shown by 504. In order to avoid the sticking of the liquid crystal color shutter due to the application of a dc voltage, black serving as the fourth display color is displayed in the latter half of the display period for each of R, G and B. That is, [R: red], [K: black], [G: green], [K: black], [B: blue] and [K: black] are displayed on the display region 401 of the liquid crystal color shutter 101 in that order in one field period. The characteristics of voltages applied to the liquid crystal cells 102 and 103 are shown by 502 and 503, respectively, in accordance with the polarities of voltages applied to the liquid crystal cells as shown in FIG. 6A.

Actually, one field period includes six transient response period periods T~0.3 ms of the liquid crystal. Since the ratio of each of the R, G and B display periods to the black display period is selected to be 3:1, the voltage applied periods for positive and negative polarities of voltages applied in one field period are equal to each other. Therefore, no dc components are continuously applied to the liquid crystal cell, so that the deterioration of display due to sticking and so forth is not caused.

On the other hand, on the side of the CRT 109, the beam scanning on a part corresponding to the display region 401 causes white phosphors to be luminous. The emission intensity of the phosphors on the display region 401 in the display periods for the R, G and B images as shown by 504 is shown by 505 in FIG. 8. The emission form for each of the display periods for the R, G and B images is divided into an emission form for a period, in which a CRT display region corresponding to the display region 401 is scanned by an electron beam, and an emission form for an afterglow period, in which the emission intensity gradually attenuates while another display region is scanned after the scanning of the display region 401 is completed. In the image display system of the present invention, when the display of the liquid crystal color shutter 101 is switched from the R display to the black display, the emission intensity of the phosphor is preferably less than −40 dB to the emission intensity in the scanning period. In the case of the first preferred embodiment, the display region is divided into equal six parts (n=6), and the field frequency is 60 Hz. Therefore, assuming that the response speed of the liquid crystal cell is T=0.3 ms, and if the afterglow time of the phosphor approximates using an exponential function, the 1/10 afterglow time τ of the white phosphor capable of being used for the CRT 109 is τ≦1.47 ms.

Figure 9:
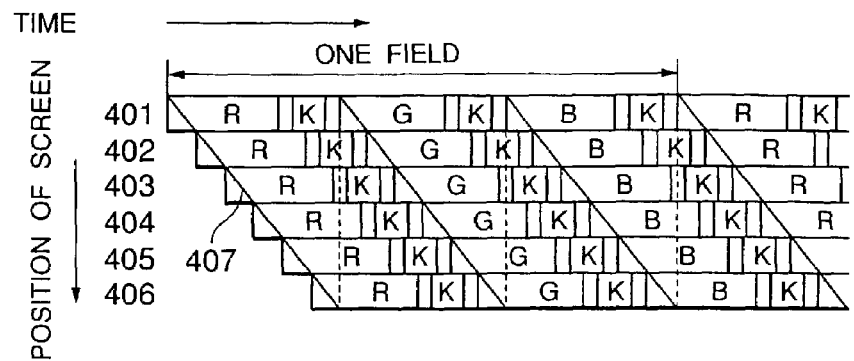
FIG. 9 is a diagram showing the phase relationship between R, G and B display periods in the first preferred embodiment of a liquid crystal color shutter according to the present invention, and the electron beam scanning of a CRT.
Figure 10:
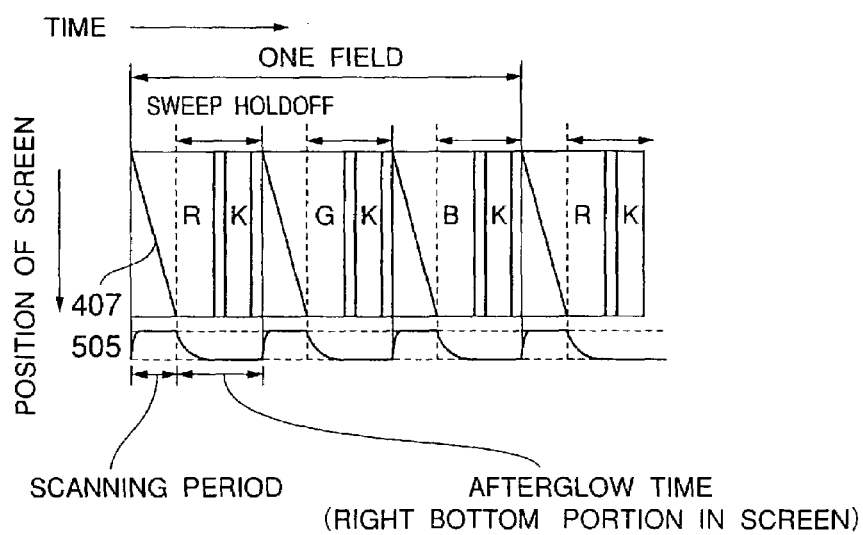
FIG. 10 is a diagram showing a problem when a liquid crystal color shutter is driven without the division of a screen thereof.

FIG. 9 shows the phase relationship between the R, G and B display periods in the liquid crystal color shutter 102 for the display regions 401 through 406 shown in FIG. 7A and the electron beam scanning of the CRT 109. FIG. 9 schematically shows time in lateral directions and vertical positions on the screen in vertical directions. As the electron beam scans from the left-upper to the right-lower on the screen, the R, G and B displays on the liquid color shutter 102 sequentially carries out scroll operation so that the phase relationship shown in FIG. 8 is held in each of the display regions 401 through 406. At this time, a plurality of display colors are always displayed on the screen of the liquid crystal color shutter 102 in order to minimize the fly back period (shown by dotted lines in the drawing) at the vertical sweep of an electron beam to prevent a beam sweep quiescent time from being caused. If the liquid crystal color shutter is driven by such a technique, some images are always displayed on the CRT screen in a period other than the blanking period necessary for the fly back period to prevent the beam sweep quiescent time from being caused as shown in FIG. 10, so that the brightness of the screen is hardly deteriorated.

The second preferred embodiment of an image display system according to the present invention will be described below.

Figures 11A, 11B:
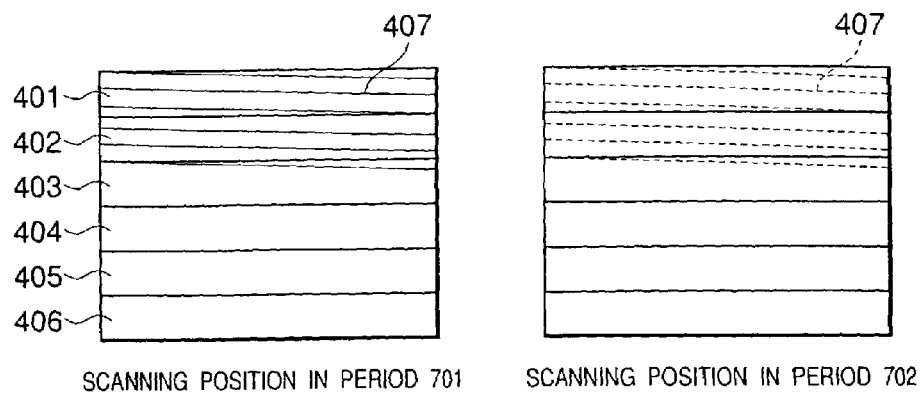
FIGS. 11A and 11B are front views of a display screen of the second preferred embodiment of an image display system according to the present invention.
Figure 11C:
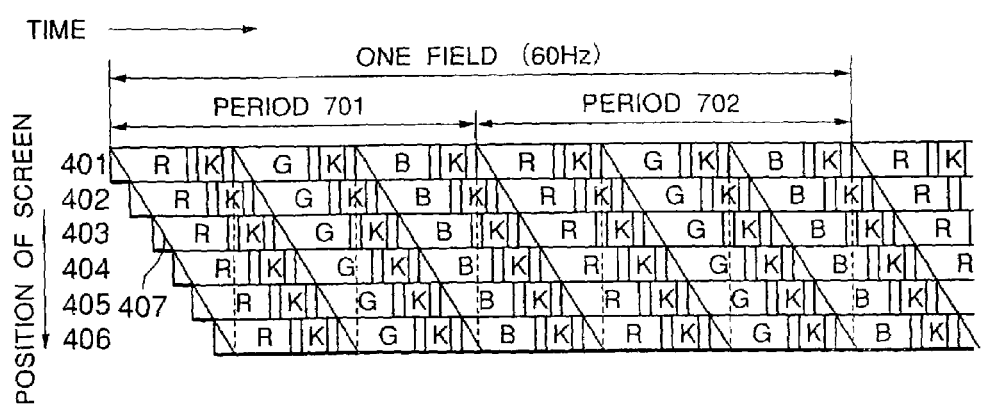
FIG. 11C is a diagram for explaining a driving method thereof.

FIGS. 11A, 11B and 11C are diagrams for explaining the second preferred embodiment.

FIGS. 11A and 11B are front views showing the scanning positions on a screen in scanning periods 702, 702, respectively, and FIG. 11C is a schematic diagram showing the relationship between the R, G and B display periods in the liquid crystal color shutter and the electron beam scanning positions on the CRT. The second preferred embodiment is characterized in that the number N of cycles for switching R, G and B in one field period is 2. Therefore, in the image display system in this preferred embodiment, the number N of cycles is N=2, and the speed per one field is sixfold speed. Other constructions are the same as those in the image display system in the first preferred embodiment.

In this case, R, G and B images scan twice for each image, i.e., six times in total, so that it is possible to prevent the horizontal frequency from increasing although the vertical frequency is twice as large as that in the first preferred embodiment. Therefore, the interlace scanning is carried out for each of the first scanning 701 and the second scanning 702 so that the scanning positions are interpolated in another. In the second preferred embodiment, if the field frequency is 60 Hz which is the same as that in the first preferred embodiment, the 1/10 afterglow permissible time τ of the phosphor is τ≦0.66 ms since N=2. Since other constructions, operations and advantages are the same as those in the image display system in the first preferred embodiment, the duplicate explanations are omitted.

Figure 12:
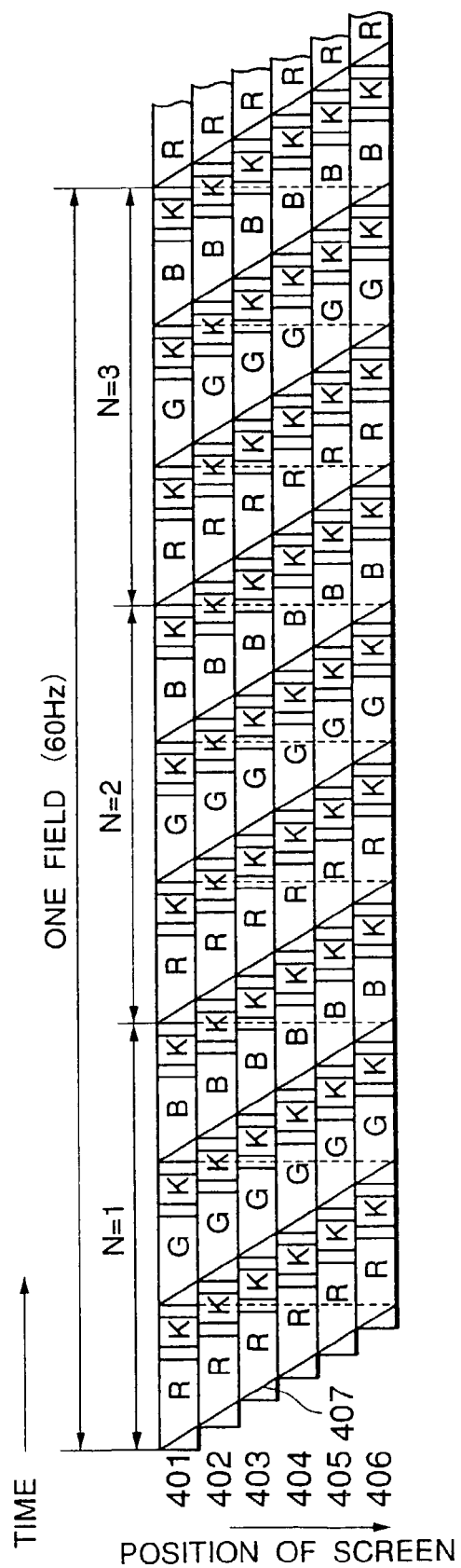
FIG. 12 is a diagram for explaining a drive for one field when the number N of cycles is 3.

Finally, as an example where the number N of cycles is 3, the third preferred embodiment of an image display system according to the present invention is shown in FIG. 12. In this preferred embodiment, as shown in FIG. 12, the number N of cycles is 3, and the speed per one field is ninefold speed. Thus, the present invention may be applied to the case where N=3 as shown in FIG. 12, not only the case where N=2 shown in FIG. 11C.

Furthermore, in the above described second and third preferred embodiments, the number N of cycles has been 2 or 3 to provide sixfold or ninefold speed, the present invention should not be limited to such multiples of 3, but the invention may be applied to, e.g., fivefold speed. For example, the fivefold speed (not shown) can be easily achieved by setting "n=1 at F=100 Hz" or "N=2 at F=50 Hz" when displaying [R], [G], [B], [R] and [G] in a period of 1/60 Hz.

Figure 13A:
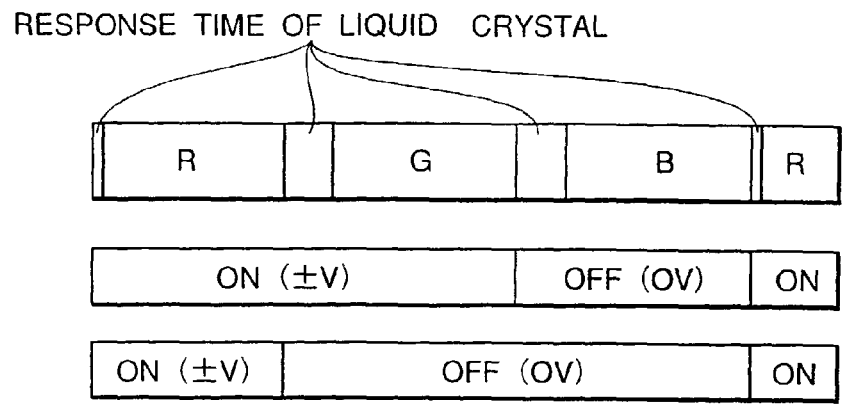
FIG. 13A is a schematic diagram showing a conventional liquid crystal (π cell) and driving voltages applied to liquid crystal cells 1 and 2.
Figure 13B:
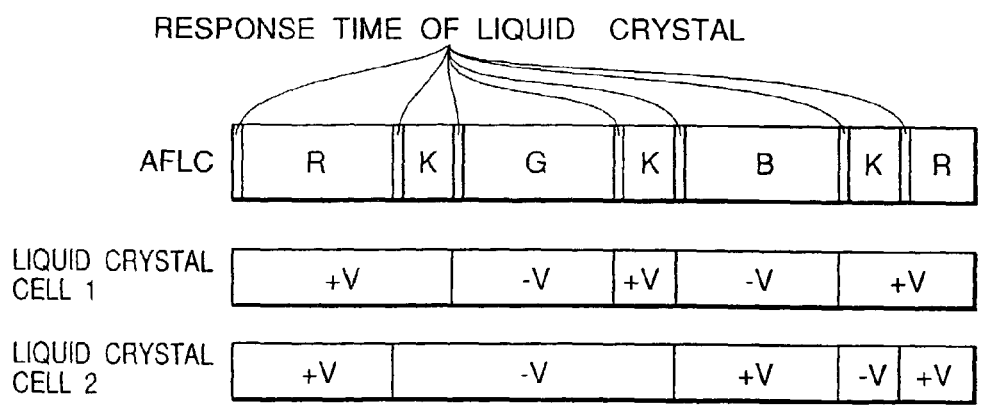
FIG. 13B is a schematic diagram showing an AFLC according to the present invention and driving voltages applied to liquid crystal cells 1 and 2.

Referring to FIG. 13B, the driving principle of the above described liquid crystal color shutter according to the present invention will be described as compared with that of a conventional π cell shown in FIG. 13A. As described above, the two liquid crystal cells are prepared in the color shutter, and the voltages applied to the two liquid crystal cells are switched to produce a plurality of states. In the conventional π cell, the voltages applied to the cells are switched between a positive (+) or negative (−) voltage and no voltage as shown in FIG. 13A to produce respective colors.

On the other hand, in the case of the operation principle of the liquid crystal color shutter according to the present invention, each of the voltages applied to the liquid crystal cells 1 and 2 is switched between +V and −V, and the voltages applied to the liquid crystal cells 1 and 2 are combined as shown in FIG. 13B to produce predetermined operation states so as to provide an R period when the voltage applied to the liquid crystal cell 1 is +V and the voltage applied to the liquid crystal cell 2 is +V, a G period when the voltage applied to the liquid crystal cell 1 is −V and the voltage applied to the liquid crystal cell 2 is −V, a B period when the voltage applied to the liquid crystal cell 1 is −V and the voltage applied to the liquid crystal cell 2 is +V, and a black (K) period when the voltage applied to the liquid crystal cell 1 is +V and the voltage applied to the liquid crystal cell 2 is −V.

Figures 14A, 14B:
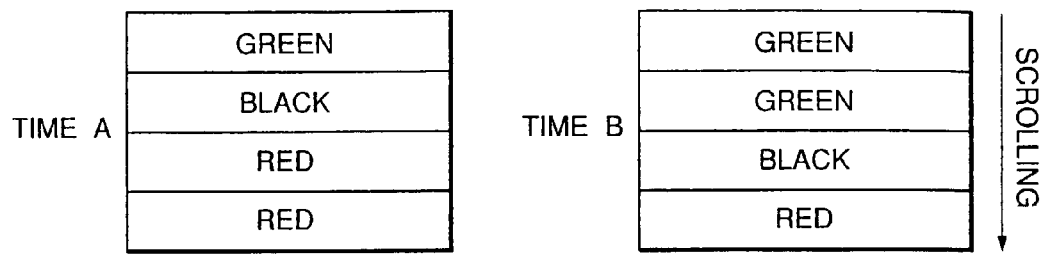
FIG. 14A is a diagram showing the scroll order of color at time A.
FIG. 14B is a diagram showing the scroll order of color at time B.
Figure 14C:
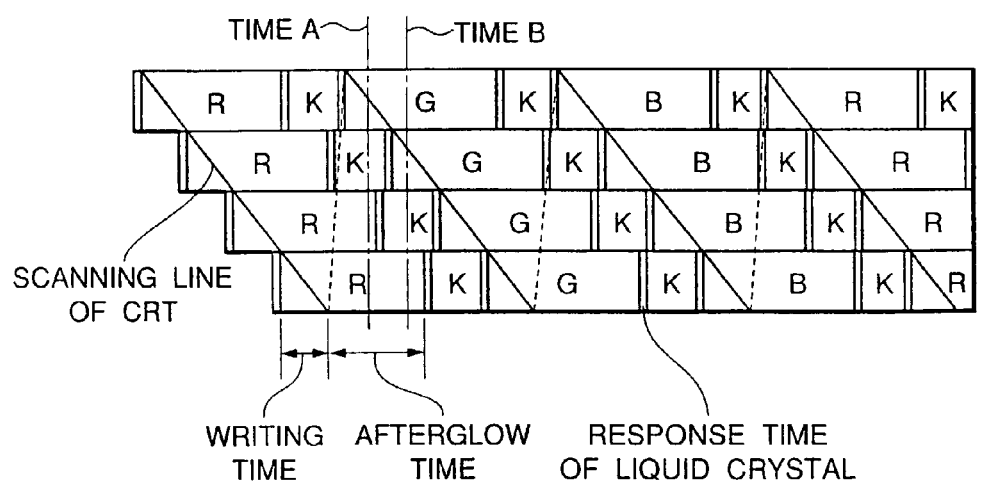
FIG. 14C is a timing chart showing the driving conditions of a liquid crystal color shutter at times A and B.

Referring to FIGS. 14A through 14C, the timings for driving the color shutter using the liquid crystal cells 1 and 2 driven at the driving timing shown in FIG. 13B will be described. For example, the display colors of the color shutter in time A are G, K, R and R as shown in FIG. 14A, and the display colors of the color shutter in time B are G, G, K and R as shown in FIG. 14B. If the times A and B are superposed on the driving timings of the color shutter, the timing can be obtained as shown in FIG. 14C.

As can be clearly seen from the description for FIG. 13B, while the present invention has been applied typically to a color liquid crystal shutter having liquid crystal cells of spontaneous polarization, such as ferroelectric and antiferroelectric liquid crystal cells, the present invention should not be limited thereto, but the invention may be applied to all of color liquid crystal shutters for carrying out optical switching operations on the basis of the inversion between positive and negative polarities. Therefore, the present invention may include chiral smectic liquid crystals and DHFs capable of being driven by such switching operations although the chiral smectic liquid crystals and DHFs.

As described in detail above, according to the present invention, it is possible to provide a liquid crystal display system which has less faults, such as color breakup interference, than those in an image display system using a conventionally proposed liquid crystal color shutter and which has a high display brightness and an enhanced quality.

The invention claim is:

1. An image display system for producing two-dimensional color images, comprising:
   a self-luminous white/black image display for time-divisionally displaying white/black two-dimensional images corresponding to three primary colors by self-emitting alone, said self-luminous image display including a controller for controlling a switching between a light emitting state and non-light emitting state, and a luminous surface for displaying two-dimensional images by converting electric signals corresponding to image data into optical data;
   a color shutter configured to be colored by at least three primary colors and for time-divisionally switching a plurality of colors to be displayed, provided in front of said luminous surface of said self-luminous white/black image display, said color shutter including a plurality of liquid crystal cells arranged over an entire display surface and having a plurality of display parts forming portions of the entire display surface and configured to change optical features of each of said plurality of display parts, and transparent electrodes formed on said entire display surface and configured to supply a voltage to at least two display parts of said plurality of display parts by converting positive and negative polarities;
   wherein said color shutter is configured to optically set display colors for said plurality of display parts and to be driven by a scroll driving, and to display a different color image on each of said display parts in an optical time in a driving condition, so that said transparent electrodes supply a constant voltage having a positive or negative polarity to said liquid crystal cells during a period of displaying a certain color; and
   wherein said self-luminous white/black image display on which displayed images are two-dimensional is provided on its surface with said color shutter.

2. An image display system as set forth in claim 1, wherein each of said liquid crystal cells of said color shutter has a ferroelectric or anti-ferroelectric liquid crystal of spontaneously polarization.

3. An image display system as set forth in claim 1, wherein each of said liquid crystal cells of said color shutter has a chiral smectic liquid crystal or a DHF for switching a potential state between at least two potential states to carry out an optical switching.

4. An image display system as set forth in claim 1, wherein said color shutter displays four colors including red, green and blue in each field period, and the total of display periods for each color in each field period is equal to each other.

5. An image display system as set forth in claim 4, wherein a fourth display color other than said red, green and blue is displayed in switching periods between said red, green and blue.

6. An image display method for producing a two-dimensional color image, comprising:
   time-divisionally displaying white/black two-dimensional images corresponding to three primary colors using a self-luminous white/black image display for self-emitting alone, which includes a controller for controlling a switching between a light emitting state and a non-light emitting state, and a luminous surface for displaying two-dimensional images by converting electric signals corresponding to image data into optical data;
   time-divisionally switching, via a color shutter configured to be colored by at least three primary colors and provided in front of said luminous surface of said self-luminous white/black image display, a plurality of colors to be displayed, said color shutter including a plurality of liquid crystal cells arranged over an entire display surface and having a plurality of display parts forming portions of the entire display surface and configured to change optical features of each of said plurality of display parts, and transparent electrodes formed on said entire display surface and configured to supply voltages to at least two display parts of the plurality of display parts by converting positive and negative polarities; and
   optically setting, via said color shutter, display colors for said plurality of display parts by driving by a scroll driving, and displaying a different color image on each of said display parts in an optical time in a driving condition, so that said transparent electrodes supply the constant voltage having a positive or negative polarity to said liquid crystal cells during a period of displaying a certain color; and wherein said self-luminous white/black image display on which displayed images are two-dimensional is provided on its surface with said color shutter.

7. An image display method as set forth in claim 6, wherein each of said liquid crystal cells has a ferroelectric or anti-ferroelectric liquid crystal of spontaneous polarization.

8. An image display method as set forth in claim 6, wherein each of said liquid crystal cells has a chiral smectic liquid crystal or a DHF for switching a potential state between at least two potential states to carry out an optical switching.

9. An image display method as set forth in claim 6, wherein said color shutter displays four colors including red, green and blue in each field period, and the total of display periods for each color in each field period is equal to each other.

10. An image display method as set forth in claim 9, wherein a fourth display color other than said red, green and blue is displayed in switching periods between said red, green and blue.

* * * * *